United States Patent
Kamins et al.

(10) Patent No.: US 7,983,519 B2
(45) Date of Patent: Jul. 19, 2011

(54) PHOTONIC CONNECTION AND METHOD FOR ENHANCING ALIGNMENT ACCURACY THEREOF

(75) Inventors: Theodore I. Kamins, Palo Alto, CA (US); Wei Wu, Palo Alto, CA (US); Shih-Yuan Wang, Palo Alto, CA (US); Philip J Kuekes, Menlo Park, CA (US); Michael Tan, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 142 days.

(21) Appl. No.: 12/253,201

(22) Filed: Oct. 16, 2008

(65) Prior Publication Data

US 2009/0190892 A1 Jul. 30, 2009

Related U.S. Application Data

(60) Provisional application No. 61/024,717, filed on Jan. 30, 2008.

(51) Int. Cl.
*G02B 6/26* (2006.01)
*G02B 6/42* (2006.01)

(52) U.S. Cl. .............................. 385/50; 385/39; 385/52
(58) Field of Classification Search ................. 385/50, 385/52

See application file for complete search history.

(56) References Cited

U.S. PATENT DOCUMENTS

| 4,097,118 | A | * | 6/1978 | Hammer | 385/30 |
| 4,726,641 | A | * | 2/1988 | Mori | 385/39 |
| 5,359,686 | A | * | 10/1994 | Galloway et al. | 385/49 |
| 5,953,477 | A | * | 9/1999 | Wach et al. | 385/115 |

FOREIGN PATENT DOCUMENTS

| JP | 58072911 A | 5/1983 |
| JP | 5173038 A | 7/1993 |

* cited by examiner

*Primary Examiner* — Rhonda S Peace

(57) ABSTRACT

A photonic connection includes a first fiber and a second fiber. The first fiber has a core with a first predetermined pattern defined on or in a facet thereof, and the second fiber has a core with a second predetermined pattern defined on or in a facet thereof. The second predetermined pattern is complementary to the first predetermined pattern such that the first fiber or the second fiber fits into another of the second fiber or the first fiber at a single orientation and position.

20 Claims, 3 Drawing Sheets

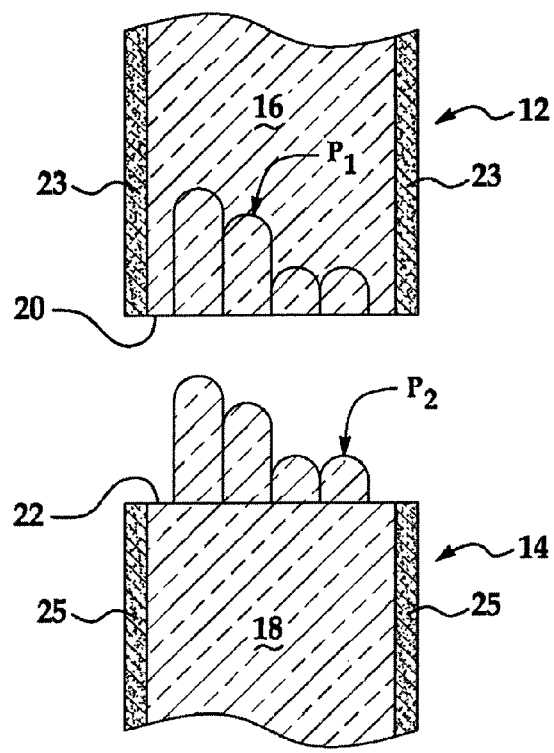
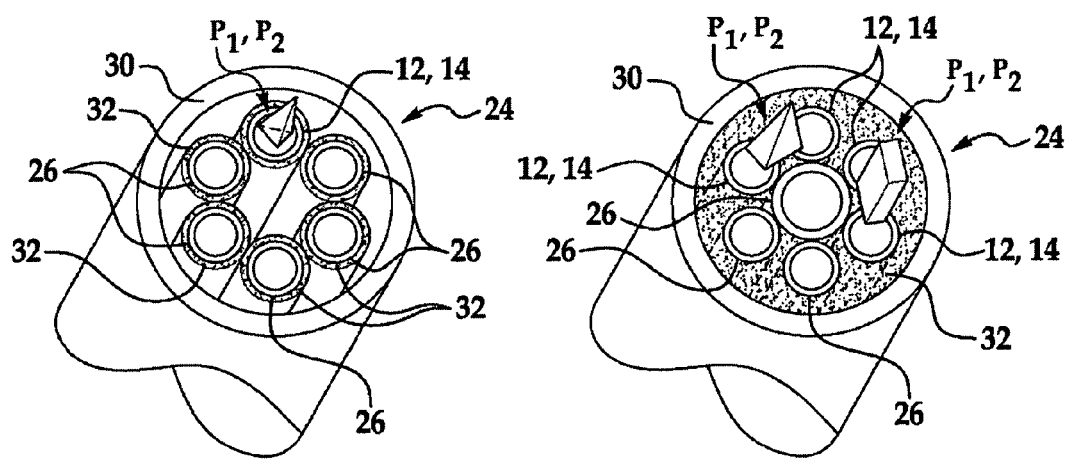
FIG. 3
FIG. 4A FIG. 4B

US 7,983,519 B2

PHOTONIC CONNECTION AND METHOD FOR ENHANCING ALIGNMENT ACCURACY THEREOF

CROSS-REFERENCE TO RELATED APPLICATION

The present application claims priority from provisional application Ser. No. 61/024,717, filed Jan. 30, 2008, the contents of which are incorporated herein by reference in their entirety.

BACKGROUND

The present disclosure relates generally to photonic connections and methods for enhancing alignment accuracy thereof.

Since the inception of digital technology and other like technologies used for high-capacity information transmission, a consistent trend has been toward the development of systems and components that increase the efficiency and quality of such transmissions. Optical fibers are one example of such components. Many optical fibers may be bundled together to form optical fiber ribbons, which may be attached to other optical fiber ribbons via connectors. These attached optical fiber ribbons may be used as transmission lines.

BRIEF DESCRIPTION OF THE DRAWINGS

Features and advantages of embodiments of the present disclosure will become apparent by reference to the following detailed description and drawings, in which like reference numerals correspond to the same or similar, though perhaps not identical, components. For the sake of brevity, reference numerals having a previously described function may or may not be described in connection with subsequent drawings in which they appear.

FIG. 3 is a longitudinal-sectional view taken of an embodiment of a first fiber and a second fiber having complementary patterns;

FIG. 4A is a schematic end perspective cut-away view of an embodiment of a fiber bundle including a jacket layer and a buffer layer;

FIG. 4B is a schematic end perspective cut-away view of another embodiment of a fiber bundle including a jacket layer and a buffer layer;

DETAILED DESCRIPTION

Embodiments of the photonic connections disclosed herein include fibers and bundles of fibers with complementary patterns having a single fitting orientation and position. This single fitting orientation and position is believed to advantageously enhance accuracy in aligning the fibers and/or fiber bundles. The patterns disclosed herein advantageously break rotational and transitional positioning, thus creating a single arrangement for joining the fibers/fiber bundles together. Connectors should align fibers together with desirable alignment accuracy, and an alignment accuracy of about 1 micron is achievable with the connectors disclosed herein. Furthermore, the embodiments of the photonic connectors have a desirably small size and are relatively compact.

Figure 1:
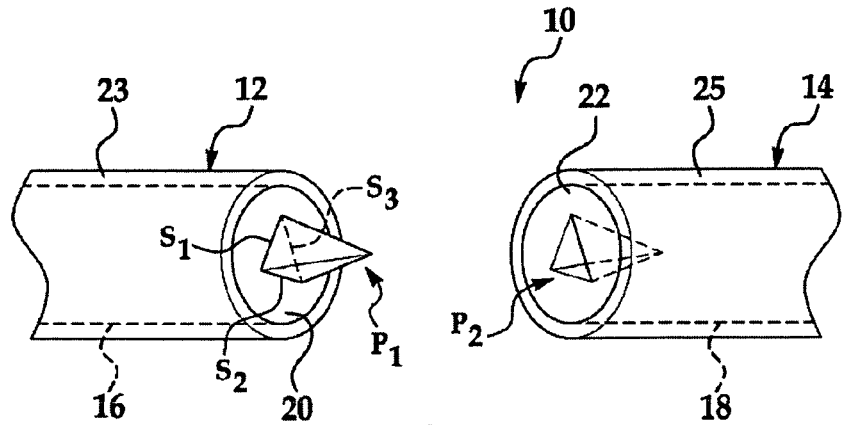
FIG. 1 is a schematic perspective cut-away view of an embodiment of the photonic connection.

Referring now to FIG. 1, an embodiment of a photonic connection 10 is depicted. The photonic connection 10 includes two fibers 12, 14, each of which has a core 16, 18, a facet 20, 22 of the core 16, 18, and a cladding layer 23, 25 which surrounds the core 16, 18. Generally, the fibers 12, 14 are optical fibers with the core 16, 18 formed of, for example, glass (e.g., silica, fluorozirconate, fluoroaluminate, or chalcogenide glasses) or polymeric materials, and the cladding layer 23, 25 is formed of an optical material (generally having a refractive index less than the core material, a non-limiting example of which includes a doped silicon dioxide). In some instances, the fiber(s) 12, 14 are polarization preserving fibers. The core 16, 18 enables light to travel through the fiber 12, 14, and the cladding layer 23, 25 reflects light back into the core 12, 14. The individual fibers 12, 14 may also have an additional coating (not shown) established thereon which protects the fibers 12, 14 from damage and/or moisture.

The fibers 12, 14 may be formed and coated using any suitable process, including drawing the fibers from a preform blank and threading the strands through one or more of coatings. As a non-limiting example, the preform is drawn by heating to a predetermined temperature, and then a protective coating is applied to the resulting fiber 12, 14 and is cured by exposure to Ultraviolet light.

The facets 20, 22 and cores 16, 18 of the respective fibers 12, 14 may have any suitable configuration, including, but not limited to cylindrical, elliptical and/or rectangular configurations. The fiber(s) 12, 14 may also be doped with rare-earth elements (e.g., erbium), which acts as a gain medium, for example, in amplifier and fiber laser applications.

Generally, the fibers 12, 14 are measured on the micron scale (ranging from about 1 micron to about 300 microns). The size (e.g., diameter, or other measurement depending on the configuration of the fiber 12, 14) of the core 16, 18 and/or facet 20, 22 depends, at least in part on the mode of the fiber 12, 14. Single-mode fibers 12, 14 (i.e., fibers which support a single ray of light (mode)) have a core diameter ranging from about 8 microns to about 10 microns. Multi-mode fibers 12, 14 (i.e., fibers which support many propagation paths or transverse modes) have a larger core diameter than single-mode fibers, a non-limiting example of which ranges from about 50 microns to about 80 microns.

In one embodiment, one or more of the fibers 12, 14 is/are holey fibers, which have a substantially regular arrangement of air holes extending along the length of the fiber 12, 14 to act as the cladding layer 23, 25. The core 16, 18 is generally formed by a solid region in the center of the substantially regular arrangement of air holes, or by an additional air hole in the center of the substantially regular arrangement of air holes. As a non-limiting example, holey fibers may be made from a preform using many hollow glass capillaries arranged in a regular predetermined pattern. The dimension of the drawn capillaries determines the pitch and hole diameter of the fiber lattice, thereby specifying its optical properties. The preform may be drawn in the same manner as previously described for fibers 12, 14. It is to be understood that such holes may be arranged in a desirable photonic bandgap pattern or alternatively to change the effective index of the core 16, 18 and cladding layer 23, 25. Such holey fibers may have multiple guiding regions or cores with different geometries for polarization preserving and/or high bandwidth.

As shown in FIG. 1, each of the fibers 12, 14 has a pattern $P_1$, $P_2$ defined in or on the respective facet 20, 22. It is to be understood that any desirable asymmetrical pattern (i.e., non-symmetrical) and/or aperiodic pattern (i.e., non-periodic patterns) $P_1$, $P_2$ may be used, as long as the patterns $P_1$, $P_2$ are complementary. The complementary asymmetrical and/or aperiodic configuration enables one of the fibers 12, 14 to fit into the other of the fibers 14, 12 at a single orientation and position. Generally, one of the patterns $P_1$, $P_2$ includes at least one raised/protruding shape, while the other of the patterns $P_1$, $P_2$ includes at least one complementary recessed/depressed shape. For example, in the embodiment shown in FIG. 1, the fiber 12 has a protruding pyramidal shaped pattern $P_1$ formed on the facet 20, and the fiber 14 has a complementary recessed pyramidal shaped pattern $P_2$ formed in the facet 22 and extending into the core 18. In this embodiment, the recessed pyramidal shaped pattern $P_2$ receives the protruding pyramidal shaped pattern $P_1$ when the fibers 12, 14 are properly aligned.

Generally, the shape of the patterns $P_1$, $P_2$ (and/or overall patterns $P_{O1}$, $P_{O2}$, described further hereinbelow) is such that the fibers 12, 14 (and/or bundles 24, 28, described further hereinbelow) are able to be connected at a single orientation and position. As used herein, the term "single orientation" means that the fibers 12, 14 (and/or bundles 24, 28) do not have rotational or translational symmetry.

Furthermore, the pattern of the fibers 12, 14 (and/or bundles 24, 28) is such that the fibers 12, 14 (and/or bundles 24, 28) fit together one way. In some instances, when the fibers 12, 14 (and/or bundles 24, 28) "fit together one way", the facets 20, 22 of the fibers 12, 14 (and/or bundles 24, 28) are mated or are close together such that the z-distance between the fibers 12, 14 (and/or bundles 24, 28) approaches or reaches zero. The z-distance is generally no more than ⅕ the wavelength of light traveling through the fibers 12, 14. In an alternate embodiment, when the fibers 12, 14 (and/or bundles 24, 28) "fit together one way", the facets 20, 22 of the fibers 12, 14 (and/or bundles 24, 28) are mated or are close together such that the tilt angle between the fibers 12, 14 (and/or bundles 24, 28) approaches or reaches zero. The tilt angle is generally less than 2°, and in some instances, is less than 1°. It is to be understood that sensors (e.g., metal pads) may be included at each quadrant of the respective fibers 12, 14 (and/or fiber bundles 24, 28) such that once the desired tilt tolerance is achieved, electrical continuity is made between the respective fibers 12, 14 (and/or fiber bundles 24, 28).

As a non-limiting example, the pyramidal shaped patterns $P_1$, $P_2$ shown in FIG. 1 is configured so that each side $S_1$, $S_2$, $S_3$ of the pyramid is different, and as such, the fiber 12 fits into the fiber 14 one way, and once fit together, the fibers 12, 14 cannot be rotated.

The patterns $P_1$, $P_2$ may include one or more non-regular geometric shapes (e.g., trapezoids, non-equilateral triangles, non-equilateral pyramids (as shown in FIG. 1), irregular star polygons, spirals, or the like), two or more different regular geometric shapes (e.g., combinations of squares, rectangles, triangles, trapezoids, pyramids, stars, diamonds, ovals, straight or curvy lines, or the like), or combinations of non-regular and regular geometric shapes. It is to be understood that when forming the patterns $P_1$, $P_2$, it is desirable to achieve a single orientation and position (i.e., a one-way fit) for the fibers 12, 14. As such, symmetrical shapes (such as squares, rectangles, etc.) may be used in combination with other (generally different) symmetrical or non-symmetrical shapes to form a non-symmetrical and/or non-periodic one-way fitting pattern $P_1$, $P_2$. For example, the fiber 12 may have a pattern $P_1$ of multiple protruding squares configured such that the complementary pattern $P_2$ of multiple recessed squares in fiber 14 can receive the pattern $P_1$ one way.

The patterns $P_1$, $P_2$ may be formed using any suitable technique. Non-limiting examples of such techniques include photolithography, embossing, focused ion beam etching, laser ablation, or the like.

Figure 2A:
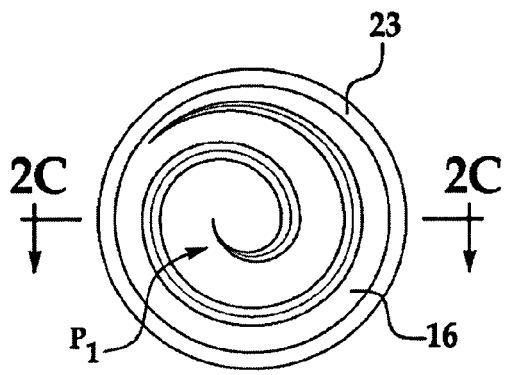
FIGS. 2A and 2B are schematic end views of an embodiment of a first fiber and a second fiber having complementary patterns defined therein and thereon, respectively.
Figure 2B:
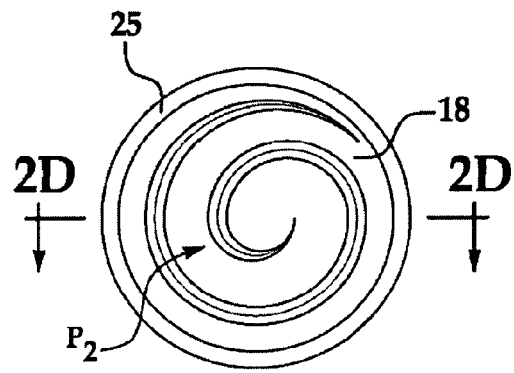
Figure 2C:
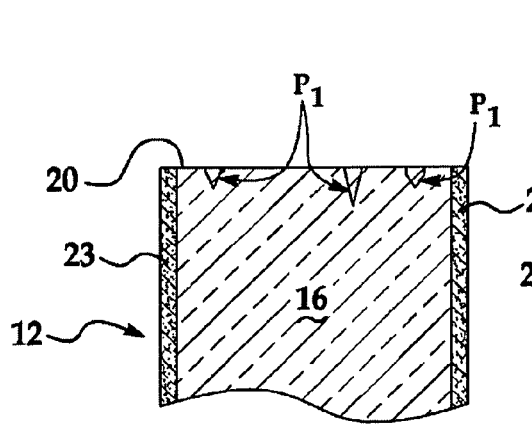
FIGS. 2C and 2D are longitudinal-sectional views respectively taken along the 2C-2C line of FIG. 2A and along the 2D-2D line of FIG. 2B.
Figure 2D:
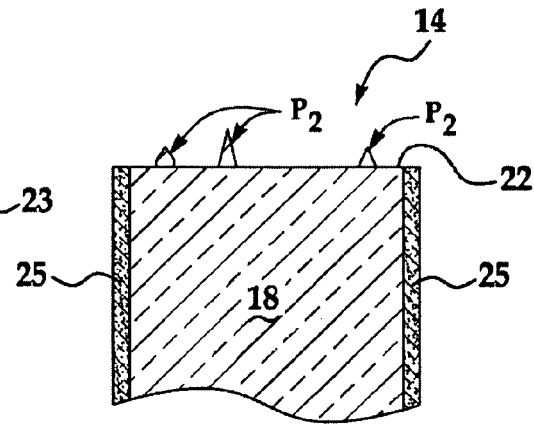

FIGS. 2A through 2D illustrate an embodiment of the fibers 12, 14 including multifaceted patterns $P_1$, $P_2$. The patterns $P_1$, $P_2$ shown in FIGS. 2A through 2D combine multiple shapes together to form a pair of fibers 12, 14 that may be connected in a single manner. Such patterns $P_1$, $P_2$ are both non-symmetrical and non-periodic. Specifically, FIGS. 2A and 2C illustrate, respectively, end and longitudinal-sectional views of one of the fibers 12, and FIGS. 2B and 2D illustrate, respectively, end and longitudinal-sectional views of a complementary fiber 14.

The end views (FIGS. 2A and 2B) show that the fibers 12, 14 have mirror image spiral patterns $P_1$, $P_2$ formed therein or thereon. The longitudinal-sectional view of FIG. 2C illustrates that the pattern $P_1$ is formed in the facet 20 (extending into the core 16) and includes various triangular-shaped depths around the spiral. For example, near the center of the spiral, the shape of the recess is a relatively small triangle, and near the end of the spiral, the shape of the recess is a larger triangle. As shown in FIG. 2D, the pattern $P_2$ is formed on the facet 22 and includes complementary triangular-shaped protrusions around the spiral. The combination of the spiral shape and the various triangular dimensions along the spiral ensure a one-way single orientation and lack of rotational and transitional positioning for the fibers 12, 14.

FIG. 3 illustrates yet another longitudinal-sectional view of complementary patterns $P_1$, $P_2$. The finger-like patterns $P_1$, $P_2$ shown in FIG. 3 fit together in a single orientation and position. As shown, the fiber 14 has the pattern $P_2$ protruding from the facet 22, and the fiber 12 has the pattern $P_1$ recessed into the facet 20 and core 16.

Referring now to FIG. 4A, respective fibers 12, 14 may be included in a bundle 24 (also known as a cable). The bundle 24 may include cylindrical core fibers, elliptical core fibers, rectangular core fibers and/or combinations thereof.

It is to be understood that two bundles 24, 28 (see FIG. 5) may be configured in the same manner as the single fibers 12, 14 such that overall patterns $P_{O1}$, $P_{O2}$ (see FIG. 5) of the bundles 24, 28 fit together at a single orientation. In the embodiment of FIG. 4A, the overall pattern of the bundle 24 is the pattern $P_1$, $P_2$ of the fiber 12, 14 included in the bundle 24.

Further, it is to be understood that the additional fibers 26 in the bundle 24 may be patterned or unpatterned, as long as one patterned fiber 12, 14 is included in the bundle 24, and the other of the patterned fibers 14, 12 is included in a complementary bundle 28. Any desirable number of patterned and/or unpatterned fibers 12, 14, 26 may be included in a bundle 24, 28. In a non-limiting example, ten fibers 12, 14, 26 are included, and the diameter of bundle 24, 28 is about 100 microns. As many as hundreds or thousands of fibers 12, 14, 26 may be arranged in a bundle 24, 28. It is to be understood that since the number of fibers 12, 14, 26 and the diameters of the fibers 12, 14, 26 included in the bundle 24, 28 may vary, the diameter of the bundle 24, 28 may also vary. Furthermore, the fibers 12, 14, 26 in the bundle 24, 28 may be arranged in any desirable configuration, including, but not limited to, a petal pattern (shown in FIGS. 4A, 4B and 5), a linear pattern (see FIG. 6), or a random orientation.

The bundle 24, 28 may further include a jacket layer 30 surrounding the plurality of fibers 12, 14, 26. The jacket layer 30 has a thickness of about 125 microns, but may be increased or decreased as is desired. Non-limiting examples of suitable materials for the jacket layer 30 include polymeric materials.

A buffer layer 32 may also be established between the jacket layer 30 and the plurality of fibers 12, 14, 26. The buffer layer 32 may be established (e.g., as the previously mentioned additional layer) on the cladding layer 23, 25 of the fibers 12, 14, 26 and/or may fill spaces between respective fibers 12, 14, 26. As shown in FIG. 4A, the buffer layer 32 is established on each of the individual fibers 12, 14, 26. The thickness of the buffer layer 32 is about 250 microns, but may be increased or decreased as is desired. Non-limiting examples of suitable materials for the buffer layer 32 include silicon dioxide with a desirable level of doping.

FIG. 4B illustrates another embodiment of a bundle 24. In this embodiment, the pattern $P_1$, $P_2$ includes multiple shapes that extend across multiple fibers 12, 14. As such, the pattern $P_1$, $P_2$ may be defined in or on at least some of the core 16, 18 and at least some of the cladding layer 23, 25 of two or more fibers 12, 14. Similar to the embodiment shown in FIG. 4A, the overall pattern of the bundle 24 is the pattern $P_1$, $P_2$ of the fibers 12, 14 included in the bundle 24.

FIG. 4B also illustrates the buffer layer 32 established to fill the spaces between respective fibers 12, 14, 26.

Figure 5:
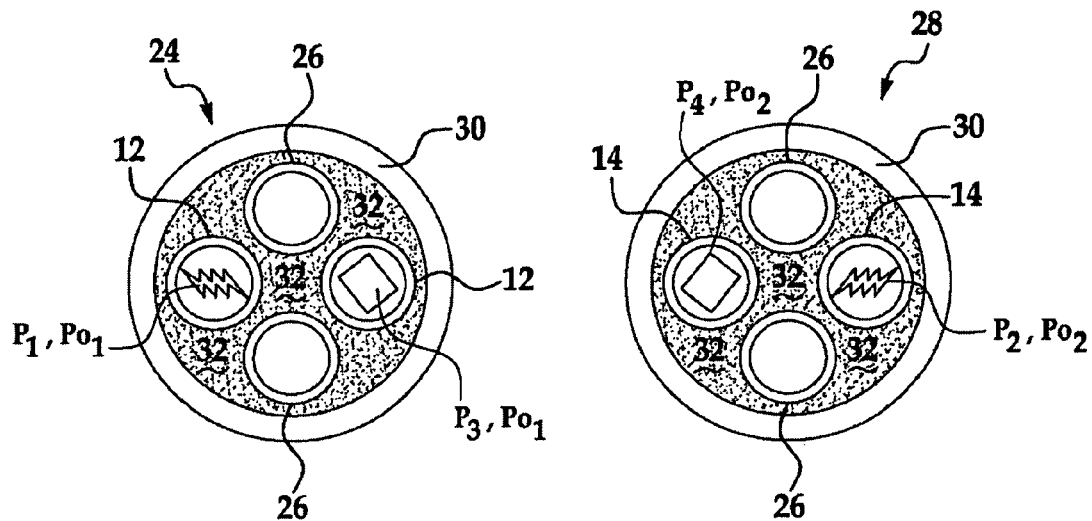
FIG. 5 is a schematic end view of an embodiment of a first fiber bundle and a second fiber bundle having complementary patterns defined therein and thereon.

As previously mentioned, FIG. 5 depicts end views of complementary fiber bundles 24, 28. The bundles 24, 28 each include a plurality of fibers 12, 14, 26, including patterned fibers 12, 14 and unpatterned fibers 26. Together, the individual or respective patterns $P_1$, $P_3$ of the fibers 12 form an overall pattern $P_{O1}$ of the bundle 24. Likewise, the individual or respective patterns $P_2$, $P_4$ of the fibers 14 together form an overall pattern $P_{O2}$ of the bundle 28. As shown in FIG. 5, the overall patterns $P_{O1}$, $P_{O2}$ of the bundles 24, 28 are complementary (i.e., one of the bundles 24, 28 fits into another of the bundles 28, 24 at a single orientation and position).

The overall patterns $P_{O1}$, $P_{O2}$ may form a particular design (i.e., the individual patterns together depict a particular object or shape, for example, a spiral) or may form a random design (i.e., the individual patterns together do not depict a particular object or shape, as shown in FIG. 5). In an embodiment, the overall patterns $P_{O1}$, $P_{O2}$ are formed by defining the patterns $P_1$, $P_3$, $P_2$, $P_4$ on the respective fibers 12, 14 and then bundling the fibers 12, 14, 26 in a predetermined manner. In another embodiment, the fibers 12, 14, 26 may be bundled and then the overall patterns $P_{O1}$, $P_{O2}$ may be defined thereon. It is to be understood that overall patterns $P_{O1}$, $P_{O2}$ that extend across multiple fibers 12, 14 (such as pattern $P_1$, $P_2$ shown in FIG. 4B) are generally formed by bundling the fibers 12, 14, 26 together and then defining the pattern $P_1$, $P_2$ on the desirable fibers 12, 14.

Figure 6:
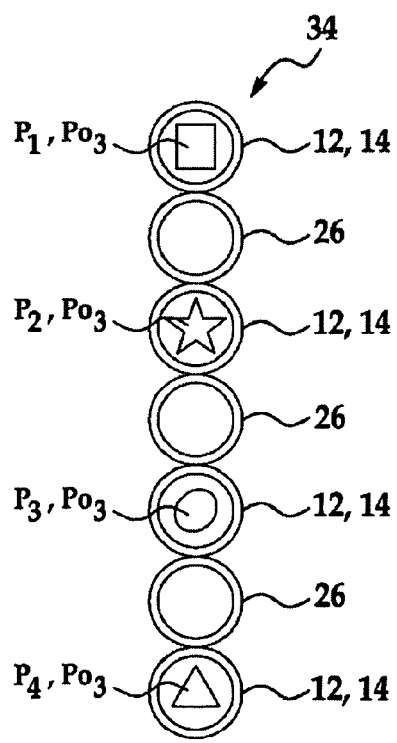
FIG. 6 is a schematic end view of an embodiment of a fiber bundle that is linearly arranged, where the respective patterns define an overall pattern for the bundle.

FIG. 6 depicts still another embodiment of a bundle 34 of fibers 12, 14, 26 (note that jacket layer 30 and buffer layer 32 are not shown). The fibers 12, 14, 26 are linearly arranged. The respective or individual patterns $P_1$, $P_2$, $P_3$, $P_4$ of the fibers 12, 14 include different regular and non-regular shapes, which gives the overall pattern $P_{O3}$ of the bundle 34 a unique one-way configuration. It is to be understood that the complementary bundle (not shown) would have the mirror image of the overall pattern $P_{O3}$ either formed on or in the facet 22, 20 such that it fits into or receives the overall pattern $P_{O3}$.

While several embodiments have been described in detail, it will be apparent to those skilled in the art that the disclosed embodiments may be modified. Therefore, the foregoing description is to be considered exemplary rather than limiting.

What is claimed is:

1. A photonic connection, comprising:
    a first fiber having a core with a first predetermined pattern defined on or in a facet thereof; and
    a second fiber having a core with a second predetermined pattern defined on or in a facet thereof, the second predetermined pattern being complementary to the first predetermined pattern such that i) the first fiber or the second fiber fits into an other of the second fiber or the first fiber at a single orientation and position, and ii) the first fiber and the second fiber, after being fit into the other of the second fiber or the first fiber to form the photonic connection, cannot be rotated and cannot be translated;
    wherein each of the first and second predetermined patterns is chosen from any asymmetrical pattern, any aperiodic pattern, or combinations thereof.

2. The photonic connection as defined in claim 1, further comprising:
    a first bundle of fibers including the first fiber and a plurality of other first fibers, wherein at least one of the other first fibers has a core with a respective predetermined pattern defined on or in a facet thereof such that the first bundle of fibers has a first overall predetermined pattern defined by the first predetermined pattern and the respective predetermined pattern of the at least one of the other first fibers; and
    a second bundle of fibers including the second fiber and a plurality of other second fibers, wherein at least one of the other second fibers has a core with a respective predetermined pattern defined on or in a facet thereof such that the second bundle of fibers has a second overall predetermined pattern defined by the second predetermined pattern and the respective predetermined pattern of the at least one of the other second fibers;
    wherein the second overall predetermined pattern is complementary to the first overall predetermined pattern such that the first bundle of fibers or the second bundle of fibers fits into an other of the second bundle of fibers or the first bundle of fibers at a single orientation and position.

3. The photonic connection as defined in claim 1 wherein the first fiber is one of a first plurality of fibers making up a first bundle of fibers, and wherein the second fiber is one of a second plurality of fibers making up a second bundle of fibers.

4. The photonic connection as defined in claim 3 wherein each of the first and second plurality of fibers is arranged linearly or in a petal pattern.

5. The photonic connection as defined in claim 3 wherein each of the first and second bundle of fibers further comprises:
    a jacket layer surrounding the respective first and second plurality of fibers; and
    a buffer layer established between the jacket layer and the respective first and second plurality of fibers, and between respective fibers in each of the first and second plurality of fibers.

6. The photonic connection as defined in claim 1 wherein the first fiber and the second fiber are selected from single-mode fibers, multi-mode fibers, holey fibers, and combinations thereof.

7. The photonic connection as defined in claim 1 wherein each of the first and second predetermined patterns is chosen from any asymmetrical pattern.

8. The photonic connection as defined in claim 1 wherein each of the first and second predetermined patterns is chosen from any aperiodic pattern.

9. The photonic connection as defined in claim 1 wherein the first predetermined pattern includes at least one raised shape, and wherein the second predetermined pattern includes at least one depressed shape.

10. The photonic connection as defined in claim 9 wherein the raised shape and the depressed shape are selected from non-regular geometric shapes, combinations of two or more different regular geometric shapes, or combinations of non-regular and regular geometric shapes.

11. A method for using the photonic connection as defined in claim 1, the method comprising:
forming holes in each of the first fiber and the second fiber such that the holes are arranged in a predetermined photonic bandgap pattern or to change an effective index of the cores of the respective fibers.

12. A method for enhancing alignment accuracy of at least two fibers, the method comprising:
defining a first predetermined pattern on or in a facet of a core of a first fiber; and
defining a second predetermined pattern on or in facet of a core of a second fiber such that i) the second predetermined pattern is complementary to the first predetermined pattern in a manner that enables the first fiber or the second fiber to fit into an other of the second fiber or the first fiber at a single orientation and position to form a connection, ii) the first fiber and the second fiber, after being fit into the other of the second fiber or the first fiber to form the connection, cannot be rotated and cannot be translated; and iii) each of the first and second predetermined patterns is chosen from any asymmetrical pattern, any aperiodic pattern, or combinations thereof.

13. The method as defined in claim 12, further comprising:
defining a respective predetermined pattern on or in a facet of a core of at least one of a plurality of other first fibers;
incorporating the first fiber with the plurality of other first fibers to form a first bundle of fibers having a first overall predetermined pattern defined by the first predetermined pattern and the respective predetermined pattern of the at least one of the other first fibers;
defining a respective predetermined pattern on or in a facet of a core of at least one of a plurality of other second fibers; and
incorporating the second fiber with the plurality of other second fibers to form a second bundle of fibers having a second overall predetermined pattern defined by the second predetermined pattern and the respective predetermined pattern of the at least one of the other second fibers;
wherein the second overall predetermined pattern is complementary to the first overall predetermined pattern such that the first bundle of fibers or the second bundle of fibers fits into an other of the second bundle of fibers or the first bundle of fibers at a single orientation and position.

14. The method as defined in claim 12, further comprising:
incorporating the first fiber in a first plurality of fibers, thereby forming a first bundle of fibers; and
incorporating the second fiber in a second plurality of fibers, thereby forming a second bundle of fibers.

15. The method as defined in claim 14 wherein incorporating the first fiber takes place prior to or subsequent to defining the first predetermined pattern, and wherein incorporating the second fiber takes place prior to or subsequent to defining the second predetermined pattern.

16. The method as defined in claim 14, further comprising arranging at least one of the first and second bundles of fibers linearly or in a petal pattern.

17. The method as defined in claim 14 wherein incorporating the first fiber with the first plurality of fibers further comprises:
establishing a jacket layer around the first plurality of fibers including the first fiber; and
establishing a buffer layer between the jacket layer and the first plurality of fibers including the first fiber, and between respective fibers in the first plurality of fibers.

18. The method as defined in claim 14 wherein incorporating the second fiber with the second plurality of fibers further comprises:
establishing a jacket layer around the second plurality of fibers including the second fiber; and
establishing a buffer layer between the jacket layer and the second plurality of fibers including the second fiber, and between respective fibers in the second plurality of fibers.

19. The method as defined in claim 12 wherein defining the first predetermined pattern includes forming at least one raised shape on the facet of the core of the first fiber, wherein defining the second predetermined pattern includes forming at least one depressed shape in the facet of the core of the second fiber, and wherein the raised and the depressed shapes are selected from non-regular geometric shapes, combinations of two or more different regular geometric shapes, or combinations of non-regular and regular geometric shapes.

20. The method as defined in claim 12 wherein defining is accomplished via laser ablation, focused ion beam etching, photolithography, or imprint lithography.

* * * * *